US007001534B2

(12) United States Patent
Landis et al.

(10) Patent No.: US 7,001,534 B2
(45) Date of Patent: *Feb. 21, 2006

(54) ALUM PELLETS

(75) Inventors: Charles R. Landis, Littleton, CO (US); Danny Oaks, Spearfish, SD (US); Ricky P. Rothermel, Belle Fourche, SD (US); Robert A. Harvey, Lovell, WY (US); Steven Reed Gray, Highlands Ranch, CO (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/025,325

(22) Filed: Dec. 29, 2004

(65) Prior Publication Data

US 2005/0121395 A1    Jun. 9, 2005

Related U.S. Application Data

(60) Continuation of application No. 10/875,420, filed on Jun. 24, 2004, now abandoned, which is a division of application No. 10/146,966, filed on May 16, 2002, now abandoned.

(51) Int. Cl.
*C02F 1/58* (2006.01)

(52) U.S. Cl. ............... 252/176; 210/728; 210/906; 252/181

(58) Field of Classification Search ............. 504/152; 252/175, 176, 180, 181; 210/683, 764, 906, 210/747, 734, 732, 731, 730, 728, 725, 724, 210/714, 665–667
See application file for complete search history.

(56) References Cited

U.S. PATENT DOCUMENTS

| 2,345,827 | A | 4/1944 | Olin |
|---|---|---|---|
| 2,531,451 | A | 11/1950 | Maier |
| 3,453,207 | A | 7/1969 | Eck et al. |
| 3,456,796 | A | 7/1969 | Eck et al. |
| 3,506,570 | A | 4/1970 | Wukasch |
| 3,697,233 | A | 10/1972 | Peck |
| 3,930,834 | A | 1/1976 | Schulteis et al. |
| 4,080,290 | A | 3/1978 | Klantschi et al. |
| 4,415,467 | A | 11/1983 | Piepho |
| 4,507,206 | A | 3/1985 | Hughes |
| 4,765,908 | A | 8/1988 | Monick et al. |
| 4,877,524 | A | 10/1989 | Eberhardt |
| 4,880,547 | A | 11/1989 | Etani |
| 5,023,012 | A | 6/1991 | Buchan et al. |
| 5,039,427 | A | 8/1991 | Conover |
| 5,457,272 | A | 10/1995 | Hooykaas |
| 5,486,499 | A | 1/1996 | Davies et al. |
| 5,681,475 | A | 10/1997 | Lamensdorf et al. |
| 5,917,069 | A | 6/1999 | Buckl et al. |
| 6,001,382 | A | * 12/1999 | Levy ............ 424/405 |
| 6,069,113 | A | 5/2000 | Kierzkowski et al. |
| 6,165,369 | A | 12/2000 | Tanis et al. |
| 6,350,383 | B1 | 2/2002 | Douglas |
| 6,383,398 | B1 | 5/2002 | Amer |
| 6,881,346 | B1 * | 4/2005 | Landis et al. ............ 210/667 |
| 6,960,303 | B1 * | 11/2005 | Landis et al. ............ 210/667 |
| 2003/0213752 | A1 | 11/2003 | Landis et al. |
| 2003/0213753 | A1 | 11/2003 | Landis et al. |

FOREIGN PATENT DOCUMENTS

JP    S51-43334    4/1976

OTHER PUBLICATIONS

Abstract No. JP 54041924 A dated Apr. 3, 1979, entitled Lightweight Inorganic Aggregate Made by Thermal Foaming—from Alum, Slaked Lime, Alkali Borate, Phosphate or Aluminum Hydroxide Added to Siliceous Material, Bentonite and Alkali Silicate.

* cited by examiner

*Primary Examiner*—Peter A. Hruskoci
(74) *Attorney, Agent, or Firm*—Craig W. Roddy; Haynes & Boone, L. L. P.

(57) ABSTRACT

Compositions including pellets of alum, a smectite mineral material, and optionally sodium or calcium carbonate, that can be delivered to a phosphate impoundment located at or near the bottom of a body of water. The pellets of alum, smectite mineral material and optionally sodium or calcium carbonate are dropped in a body of water, and the alum is released over time, as the pellet descends to the bottom of the body of water.

29 Claims, No Drawings

ALUM PELLETS

CROSS-REFERENCE TO RELATED APPLICATIONS

This application is a continuation application of U.S. patent application Ser. No. 10/875,420, filed Jun. 24, 2004 now abandoned, the entire disclosure of which is incorporated herein by reference, which is a divisional application of U.S. patent application Ser. No. 10/146,966, filed May 16, 2002 now abandoned, the entire disclosure of which is incorporated herein by reference.

BACKGROUND

Acidic metal salt and sulfate solutions, such as aluminum sulfate $((Al_2SO_4)_3.14H_2O)$ solutions, commonly known and referred to as "alum," have long been used to remove color and suspended particles, as well as organic and microbiological contaminants from water. Alum is readily available and when diluted with surface water, it can function as a coagulant, flocculent, precipitant and emulsion breaker. As a coagulant, alum removes the primary nutrient for blue-green algae in the water. This function is important because these algae remove oxygen from the water (known as biochemical oxygen demand or BOD) and thus pose a danger to fish. Alum also forms an insoluble precipitate or floccule, i.e., a floc, with the impurities in the water. The floc grows in size as it attracts suspended and colloidal particles and organic compounds present in the water. The floc settles out of the water over time and can be removed by well known techniques such as by decanting or filtration.

One of the most difficult problems in water pollution control is the growth of algae. As noted above, algal organisms exert a BOD on the water and the algal BOD can often exceed the oxygen resources of the water. Algal growths can also cause unpleasant tastes and odors in water supplies. Dissolved phosphate ions provide algae with a necessary nutrient supply. If the phosphate supply could be removed the algae would not survive or flourish in the water column and a water pollution control problem would be addressed. An additional difficulty associated with the treatment of phosphates in water is that the majority of the phosphates (50–90%) are concentrated at the sediment-water interface of an impoundment and current application techniques involving alum primarily treat the phosphates closer to the surface of the body of water. In addition, current techniques have been focused on nearly instantaneous sorption of phosphates. As a result, the body of existing products and techniques do not perform as effectively in a number of water systems, especially high energy and deep systems, and in systems that require more than just instantaneous phosphate sorption. In the former case, alum is flushed from the target waters before it can perform. In the latter case, the alum is poorly utilized in application. Also, the alum can leave an unwanted white cloud in the water for an extended period of time.

Therefore, there is a need for simple compositions, forms and methods for treating phosphate impoundments in bodies of water.

DETAILED DESCRIPTION

The present embodiment relates generally to the production of pellets of alum, a smectite mineral-bearing industrial material such as bentonite (montmorillonite), attapulgite, saponite, hectorite, sepiolite and fullers earth and optionally sodium or calcium carbonate that can be delivered to concentrated or impounded phosphate located at the bottom of various bodies of water. More particularly, the pellets of alum, a smectite mineral material as described above and optionally sodium or calcium carbonate can be delivered to a wider range of locations in bodies of water including to sites known as the "sediment water interface" which is an area that can be generally defined as the top six inches of sediment combined with the deepest six inches of water. Even more particularly, the pellets of alum, a smectite mineral material as described above and optionally sodium or calcium carbonate are dropped through the body of water so that the alum is released when the pellet reaches the desired location in the water, thereby treating the phosphates more efficiently and using or consuming less alum.

According to one embodiment, a phosphate impoundment is treated with a composition that includes alum and a member of the smectite family of minerals as the two major components. As used herein the term "alum" shall be used to refer to aluminum sulfate $((Al_2SO_4)_3.14H_2O)$. Among the smectite bearing ores, or industrial minerals, is bentonite. Bentonite is the ore enriched in the smectite called montmorillonite. As used herein the term "smectite mineral material" shall be used to refer to bentonite, attapulgite, saponite, hectorite, sepiolite and fullers earth. This embodiment also optionally includes sodium carbonate or calcium carbonate. According to a second embodiment, the alum and smectite mineral material preferably are covered or coated by techniques well known to those skilled in the art, with one or more natural organic by-products such as corn starch, sugar-based resins, and various natural product derivatives such as chemical families of resins and starches. Suitable resins and coatings include guar gum, alginates, polyvinyl alcohol, partially hydrolyzed polyacrylamides and other similar polymers well known to those skilled in the art.

The compositions of these embodiments selectively remove phosphates from natural and man-made water systems. Phosphates are a primary nutrient for aquatic flora/fauna such as blue-green algae which produce unsightly green slimes and clouds, and undesirable odors in waters. By removing the phosphates, the algae are deprived of nourishment and therefore do not proliferate in the water column.

Each component of the compositions of the present embodiment, serves a function in the product towards the goal of optimal sorption and thus removal of phosphates. Alum is a water treatment product that is used to remove phosphates and other compounds such as dissolved organics, suspended sediment, and metals from a body of water. The primary purpose of the alum is to sorb the phosphates from the water or sediments. Alum is generally commercially available from General Chemical Corporation.

The smectite mineral material, preferably, bentonite functions to 1) optimize the timing of the dissolution of the composition in the water column, 2) buffer the pH of the water that is being treated to a neutral pH level, and 3) optimize or control the density of the composition to more precisely estimate the residence time in the water column. Bentonite is generally commercially available from Bentonite Performance Minerals.

Compositions of uncoated alum and smectite mineral material generally retain approximately 90% of their integrity or shape for up to approximately 2 minutes. Compositions of alum and smectite mineral material that have been coated with accessory additives such as water soluble resins, natural polymers and macromolecular by-products from grain and agriculture industries dissolve in water at a much slower rate than uncoated compositions. Specifically, the coated compositions generally retain approximately 90% of their integrity or shape for up to approximately 24 hours. The concentration of the accessory additives preferably is less than five percent by weight of the total composition.

According to another embodiment, the compositions preferably include a pH buffering agent selected from sodium carbonate ($Na_2CO_3$) or calcium carbonate ($Ca_2CO_3$). In addition to buffering the pH of the body of water, the pH buffering agent also enhances the density of the composition for use in higher energy—higher flow—water systems.

According to a preferred embodiment, the composition includes from 30–99% by weight of alum and from 1–70% of a smectite mineral material. According to another preferred embodiment, the composition further includes from 0–5% natural water soluble resins and by-products as a coating. According to still another preferred embodiment, the composition further includes from 0–30% of a pH buffering agent selected from sodium carbonate and calcium carbonate.

The compositions of the present embodiment are manufactured and produced according to techniques well known to those skilled in the art. Preferably, the compositions of the present embodiment are produced in the form of spheres to oblate spheroids, cylinders to cubes and three-dimensional rectangles ranging in size from ¼" to 24" in diameter. More preferably, the compositions of the present embodiment are produced in the form of tablets, pellets, extruded noodles, briquettes or ribbons by equipment well known to those skilled in the art such as extruders, tabletizers, briquetters or agglomerators. In the process of forming such tablets, extruded noodles, briquettes or ribbons, each component of the compositions are provided in powdered or granular form and the components are blended. Preferably, the raw material components are blended in the proportions noted above and are physically mixed at the desired levels in tanks or similar units of 20 to 200 ton capacity, by augers and paddles for a prescribed amount of time, preferably from 5 minutes to up to 6 hours in batch mode, or by continuous metered feed onto a common belt or in a common continuously producing extruder, pelletizer, tabletizer, or agglomerator. For instance, a typical extruder is in the form of an elongated rectangular tub with at least one and optionally two augers oriented parallel to the ground that physically mixes the materials into a uniform mixture of the composition and then passes the composition through a restricted opening to form elongated noodles or cylindrical pellets. Conventional tabletizers and pelletizers take the mixed materials from a storage tank and compress the mixture via converging die plates into forms in the order of ¼" to 1" diameter spheres and spheroids. Commercial agglomerators take the mixtures as a powder (having a particle size ranging from 44 $\mu$m to 100 $\mu$m) and non-compressively combines the mixture into spheroids. Preferably, the composition has a moisture content of from 1 to 15 percent by weight. Preferably, the compositions manufactured according to the above mentioned processes may be coated with accessory additives such as water soluble resins, natural polymers and macromolecular by-products from grain and agriculture industries according to techniques well known to those skilled in the art. Those skilled in the art will also recognize that other well known techniques may also be utilized to manufacture the compositions of the present embodiment.

The composition of the present embodiment has utility in the following water treatment markets: municipal water treatment polishing agent, commercial construction/engineering, agricultural feedstock (such as in piggeries, cattle, sheep and ostrich farms), aquaculture (fish farms and hatcheries, such as for shrimp, salmon and trout), natural lake and river systems and watersheds, recreational and leisure (golf course ponds, amusement parks and aquatic centers), industrial effluent management, and mining and exploration (tailings ponds and discharge systems).

The composition of the present embodiment, is a time release alum-based sorbent of phosphates in water. The vast majority of phosphate-laden water systems contain a minority of suspended or dissolved phosphates in the water column as compared to the sediment water interface. As used herein, the term "sediment water interface" shall be used to refer to an area in a body of water that is generally defined as the top six inches of sediment combined with the deepest six inches of water. In the vast majority of water systems such as lakes, rivers, ponds or trenches, the majority of the total phosphates is located at the sediment water interface. Powdered alum tends to remain in suspension removing the suspended phosphates, organic matter, and other sediment but rarely reaches the targeted problem area in need of such treatment. Preferably the density of individual tablets of the composition of the present embodiment ranges from 1.0 to 2.0 gm/cm$^3$. It is also preferred that the individual pellets of the composition of the present embodiment have a diameter that ranges from ¼" to 24". Most preferably, the composition of the present embodiment has a density and size such that the compositions settle quickly through the water column arriving where they are needed most at the sediment water interface.

The calculation for settling in water systems is based upon the long accepted Stokes Settling Law which describes the rate of settling of a particle based upon the density of the particle and the density of the water. This law is a proven scientific principle used in a number of industries and can be used to estimate settling distances and time parameters for the composition of the present embodiment. As noted above, the uncoated composition according to the present embodiment will retain approximately 90% of its particle integrity for about 2 minutes which translates to a minimum of 50 feet of water column at the percentages of alum and smectite mineral material indicated above.

In commercial terms, the average depth of the water columns needing to be cleaned up will be about 6', so according to Stokes Law, the uncoated product will reach the sediment water interface well in advance of the onset of significant dissolution.

VARIATIONS AND EQUIVALENTS

Although only a few exemplary embodiments have been described in detail above, those skilled in the art will readily appreciate that many other modifications are possible in the exemplary embodiments without materially departing from the novel teachings and advantages described herein. Accordingly, all such modifications are intended to be included within the scope of the following claims.

What is claimed is:

1. A composition for treating phosphate in a body of water comprising:
   a) alum; and
   b) a smectite mineral material;
   which composition, when added to a body of water, retains at least about 90 percent of the integrity of its form for at least about two minutes; and
   which composition has a density sufficient to allow the composition to settle to a sediment water interface in the body of water and release alum at the sediment water interface.

2. A composition according to claim 1, wherein the smectite mineral material is selected from the group consisting of: bentonite, attapulgite, saponite, hectorite, sepiolite and fullers earth.

3. A composition according to claim 1, comprising from about 30 to about 99 percent by weight of alum and from about 1 to about 70 percent by weight of the smectite mineral material.

4. A composition according to claim 1, which composition is in a form selected from a tablet, extruded noodle, pellet, briquette and ribbon.

5. A composition according to claim 4, wherein the selected form of the composition has a diameter of from about ¼ to about 24 inches.

6. A composition according to claim 1, wherein the composition has a density of from about 1.0 to about 2.0 $gm/cm^3$.

7. A composition according to claim 1, further comprising a pH buffer selected from the group consisting of: sodium carbonate and calcium carbonate.

8. A composition according to claim 7, wherein the composition further comprises up to about 30 percent by weight of the pH buffer.

9. A composition according to claim 1, further comprising a water soluble resin material selected from corn starch, guar gum, alginates, polyvinyl alcohol and partially hydrolyzed polyacrylamides.

10. A composition according to claim 9, which composition, when added to a body of water, retains about 90 percent of the integrity of its form for a period of time in the range of about 2 minutes to about 24 hours.

11. A composition according to claim 9, wherein the composition further comprises up to about 5 percent by weight of the water soluble resin.

12. A composition according to claim 1, having a moisture content of from about 1 to about 15 percent by weight.

13. A composition comprising:
a) alum; and
b) a smectite mineral material;
which composition is in a form selected from a tablet, extruded noodle, pellet, briquette and ribbon;
which composition, when added to a body of water, retains at least about 90 percent of the integrity of the selected form for at least about two minutes; and
which composition has a density sufficient to allow the composition to settle to a sediment water interface in the body of water and release alum at the sediment water interface.

14. A composition according to claim 13, which composition is a time-release sorbent that sorbs phosphate from the body of water.

15. A composition according to claim 13, comprising from 30 to 99 percent by weight of alum and from 1 to 70 percent by weight of the smectite mineral material.

16. A composition according to claim 13, further comprising a coating, which coating comprises a water soluble resin material selected from the group consisting of corn starch, guar gum, alginates, polyvinyl alcohol and partially hydrolyzed polyacrylamides.

17. A composition according to claim 16, which composition, when added to the body of water, retains at least about 90 percent of the integrity of the selected form for a period of time in the range of about 2 minutes and to about twenty-four hours.

18. A composition according to claim 16, comprising up to about 5 percent by weight of the water soluble resin material.

19. A composition according to claim 13, wherein the selected form of the composition has a diameter of from about ¼ to about 24 inches.

20. A composition according to claim 13, wherein the composition has a density of from about 1.0 to about 2.0 $gm/cm^3$.

21. A composition comprising
a) alum, in an amount of from about 30 to about 99 percent by weight;
b) a smectite mineral material, in an amount of from about 1 to about 70 percent by weight; and
having a moisture content of from about 1 to about 15 percent by weight,
which composition, when added to a body of water, retains at least about 90 percent of the integrity of the selected form for at least about two minutes; and
which composition has a density sufficient to allow the composition to settle to sediment water interface in the body of water and release alum at the sediment water interface.

22. A composition according to claim 21, wherein the smectite mineral material is selected from the group consisting of: bentonite, attapulgite, saponite, hectorite, sepiolite and fullers earth.

23. A composition according to claim 21 wherein the composition is in a form selected from a tablet, extruded noodle, pellet, briquette and ribbon.

24. A composition according to claim 23, wherein the selected form of the composition has a diameter of from about ¼ to about 24 inches.

25. A composition according to claim 21, wherein the composition has a density of from about 1.0 to about 2.0 $gm/cm^3$.

26. A composition according to claim 21, further comprising a pH buffer in an amount up to about 30 percent by weight.

27. A composition according to claim 26, wherein the pH buffer is selected from the group consisting of sodium carbonate and calcium carbonate.

28. A composition according to claim 21, further comprising a coating comprising a water soluble resin material selected from corn starch, guar gum, alginates, polyvinyl alcohol and partially hydrolyzed polyacrylamides.

29. A composition according to claim 28, which composition, when added to a body of water, retains at least about 90 percent of the integrity of its form for a period of time in the range of about 2 minutes to about twenty-four hours.

* * * * *